US007106709B2

(12) United States Patent
Davidsson et al.

(10) Patent No.: US 7,106,709 B2
(45) Date of Patent: Sep. 12, 2006

(54) TIMING DRIFT COMPENSATION IN WIRELESS PACKET-BASED SYSTEMS

(75) Inventors: Stefan Davidsson, Göteborg (SE); Mathias Pauli, Nuremberg (DE); Peter Schramm, Erlangen (DE); Fabian Wenger, Göteborg (SE); Udo Wachsmann, Schwabach (DE); Roger Walther, Mölndal (SE)

(73) Assignee: Telefonaktiebologet LM Ericsson (publ), Stockholm (SE)

( * ) Notice: Subject to any disclaimer, the term of this patent is extended or adjusted under 35 U.S.C. 154(b) by 895 days.

(21) Appl. No.: 09/994,944

(22) Filed: Nov. 28, 2001

(65) Prior Publication Data

US 2002/0101840 A1    Aug. 1, 2002

Related U.S. Application Data

(60) Provisional application No. 60/253,707, filed on Nov. 29, 2000.

(51) Int. Cl.
*H04Q 7/00* (2006.01)
*H04J 3/06* (2006.01)

(52) U.S. Cl. ...................... 370/330; 370/350
(58) Field of Classification Search ............... 370/203, 370/204, 208, 209, 210, 211, 215, 350, 503, 370/330
See application file for complete search history.

(56) References Cited

U.S. PATENT DOCUMENTS

| 5,257,404 | A | * | 10/1993 | Goreham et al. | ........... 455/503 |
|---|---|---|---|---|---|
| 5,959,965 | A | * | 9/1999 | Ohkubo et al. | ............. 370/203 |
| 6,028,900 | A | | 2/2000 | Taura et al. | |
| 6,031,828 | A | * | 2/2000 | Koro et al. | ................. 370/336 |
| 6,298,048 | B1 | * | 10/2001 | Lamkin et al. | ............. 370/324 |
| 6,373,861 | B1 | * | 4/2002 | Lee | ............................. 370/503 |
| 6,473,453 | B1 | * | 10/2002 | Wilkinson | ................... 375/143 |
| 6,590,881 | B1 | * | 7/2003 | Wallace et al. | ............. 370/332 |
| 6,735,454 | B1 | * | 5/2004 | Yu et al. | ...................... 455/574 |
| 6,754,170 | B1 | * | 6/2004 | Ward | .......................... 370/208 |
| 6,876,672 | B1 | * | 4/2005 | Castelain | ..................... 370/483 |
| 6,961,393 | B1 | * | 11/2005 | Cupo et al. | ................. 375/343 |
| 2002/0054611 | A1 | * | 5/2002 | Seta | ........................... 370/503 |

OTHER PUBLICATIONS

Khun-Jush et al., "Structure and Performance of the HIPERLAN/2 Physical Layer", Ericsson Eurolab Deutschland GmbH and Ericsson Mobile Data Design AB.
Torsner et al; "Radio Network Solutions for HIPERLAN/2", Ericsson Radio Systems AB.
Clmini, Jr., "Analysis and Simulation of a Digital Mobile Channel Using Orthogonal Frequency Division Multiplexing", vol. COM-33, No. 7, IEEE Transactions on Communications, Jul. 1985, pp. 665-675.

* cited by examiner

*Primary Examiner*—Huy D. Vu
*Assistant Examiner*—Blanche Wong
(74) *Attorney, Agent, or Firm*—Nixon & Vanderhye, P.C.

(57) ABSTRACT

A radio receiver system (30) comprises a radio receiver (41), a receiver sample clock (60), which is used for sampling a modulated base-band signal; and a timing correction unit (100). The timing correction unit (100) performs, in the frequency domain, a timing drift compensation between a transmitter sample clock (66) and the receiver sample clock (60). In one example context of implementation, the plural modulated radio frequency carriers have been modulated using Orthogonal Frequency Division Multiplexing (OFDM).

42 Claims, 11 Drawing Sheets

TIMING DRIFT COMPENSATION IN WIRELESS PACKET-BASED SYSTEMS

This application claims the priority and benefit of U.S. Provisional patent application No. 60/253,707, filed Nov. 29, 2000, which is incorporated herein by reference in its entirety.

BACKGROUND

1. Field of the Invention

This invention pertains to method and apparatus for determining and/or compensating for a time drift between sample clocks of a transmitter and a receiver in conjunction with transmission of plural modulated signal carriers over an air or radio interface.

2. Related Art and other Considerations

Various methods for the transmission of digital signals, such as digital video broadcasting (DVB) and digital audio broadcasting (DAB) signals, are known. One method typically used for such transmissions is the orthogonal frequency division multiplexing (OFDM) method wherein a plurality of modulated signal carriers are used broadcast the signals. Multicarrier modulation schemes as the OFDM are typically used in systems wherein the time dispersion thereof is much greater than the employed bit duration. In multicarrier modulation schemes, the modulated signal carriers are sampled before being transposed in the frequency domain by means of a fast fourier transformation (FFT) for signal separation.

Orthogonal Frequency Division Multiplexing (OFDM) will also be used in wireless local area networks (WLAN) in the 5 GHz band such as specified in Europe, the U.S. and Japan. The European WLAN standard is HIgh PErformance Radio Local Area Network type 2 (HIPERLAN/2), which is being developed by the ETSI Project BRAN (broadband radio access network). The North American and the Japanese standards are expected to have very similar physical layers.

The physical layer of HIPERLAN/2 is described in ETSI TS 101 475 V1.2.2 (2001–02), Broadband Radio Access Networks (BRAN); HIPERLAN Type 2; Physical (PHY) layer, ETSI document. The air interface of HIPERLAN/2 is based on time-division duplex and dynamic time-division multiple access. All data units in every transport channel which are transmitted via the physical layer of HIPERLAN/2 are bursts.

The frame structure 18 and an exemplary burst 20 is depicted in FIG. 1. The frame includes broadcast control channel, a frame control channel, downlink traffic, uplink traffic, and random access channels. As shown in FIG. 1, each burst 20 comprises a preamble 22 and one or several Protocol Data Units PDUs $24_1$, $24_2$, $24_3$, . . . $24_n$. Further details of preamble 22 and the PDUs $24_1$, $24_2$ . . . are illustrated in FIG. 2. Preamble 22 includes, e.g., a cyclic prefix $22_1$ and two training symbols $22_2$, $22_3$. Each PDU 24 is a data unit of several bytes tat comes from the medium access control (MAC) layer. The physical (PHY) layer converts the PDU to one or more OFDM symbols, the number of symbols depending on the link adaptation mode. While FIG. 1 shows an example PDU 24 as comprising plural OFDM symbols, for sake of simplicity FIG. 2 shows its PDUs as comprising a cyclic prefix 25 and one data symbol 26. For example, in FIG. 2 PDU $24_1$ has a cyclic prefix $25_1$ and data symbol $26_1$.

OFDM modulation is performed with a 64 point IFFT (Inverse Fast Fourier Transform) at a sample rate of 20 MHz, which gives a subcarrier spacing of 312.5 kHz and a symbol duration of 3.2 µs. The cyclic prefix 25 put in front of each symbol 26 is 800 ns, giving a total symbol length of 4 µs. Of the 64 subcarriers, only 52 subcarriers are used, of which 48 carry data and 4 are pilots.

The physical layer provides several link adaptation modes to accommodate for various channel conditions. Each mode comprises a combination of a subcarrier modulation scheme and a forward error correction code rate. The primary modulation schemes are BPSK, QPSK, 16QAM and 64QAM. The primary code rates are ½, 9/16, ¾.

In order to perform coherent demodulation, a receiver must synchronize with the transmitter both in time and frequency. Due to frequency differences between transmitters and receivers in such systems, the demodulated signal carriers can exhibit frequency offsets. An estimate of the channel must also be made.

The preambles 22 in the data stream facilitate, e.g., an assessment of frequency offsets of received signals and frequency synchronization. In case of the OFDM, the two identical OFDM symbols $22_2$, $22_3$, also referred to as C64, are inserted between cyclic prefix 21 (C32) and the actual data stream, e.g., the PDUs 24. This so-called C- preamble shown in FIG. 2 is used, e.g., for a channel estimation in the demodulation process of the multicarrier signals. Thus, an estimate of the channel is performed at the beginning of the burst with the help of the preamble, which contains the training symbols.

In HIPERLAN/2 the 20 MHz sample clock in both the transmitter and the receiver is free-running with a relative accuracy of +/−20 parts per million (ppm). The worst case scenario is therefore a +/−40 ppm offset between the sample clock frequencies in the transmitter as compared to the receiver. This potential +/−40 ppm offset causes a timing error between the transmitter and the receiver which increases with time, i.e. a timing drift. This timing drift can cause a significant disturbance in the coherent demodulation at the end of a long burst, even if the receiver is synchronized at the beginning of the burst.

The timing drift causes some undesired effects, namely: (1) phase rotation in the frequency domain; (2) inter-symbol interference; and (3) some loss of orthogonality between subcarriers. The two latter effects are not considered to influence demodulation. However, as illustrated below, the phase rotation effect can be significant.

The Fourier transform relationship of Equation 1 indicates that a time displacement $T_{off}$ of a function f(t) in the time-domain gives a linear phase factor $\omega T_{off}$ of the corresponding Fourier transform, compared to the Fourier transform $F(\omega)$ of the original function f(t).

$$f(t-T_{off}) \rightarrow \exp(-j\omega \cdot T_{off}) \cdot F(\omega) \qquad \text{Equation 1}$$

Considering a burst with the length of a MAC frame of 2 ms, which is the longest possible burst in the HIPERLAN/2 system, the time displacement at the end of the burst will be 2 ms·40 ppm=80 ns. The phase factor for the highest used subcarrier which is at 8.125 MHz will then be $\omega T_{off}=2\cdot\pi\cdot 8.125$ MHz·80 ns≈4.1 radians or 234 degrees. Such a phase error will, of course, render coherent demodulation impossible. A performance degradation will occur much earlier than this depending on the link adaptation mode.

There are various prior art methods for compensating for timing drift. A first such time drift compensation method is fine tuning a reference oscillator in the receiver (using an estimate of the timing drift) to render the timing drift negligible. A problem with this first method lies in the time it takes for the RF synthesizer to adjust to a new value. Typically the RF synthesizer is implemented with a phase locked loop (PLL), which needs settling times which are large compared to the typical duration of the preamble. Furthermore, a voltage-controlled reference will typically have more phase noise (fluctuations in frequency around a mean) than a free running oscillator reference.

As mentioned above, in order to do coherent demodulation the receiver has to calculate a channel estimate, initially calculated on the preamble. In accordance with a second prior art time drift compensation method, the initial channel estimate is monitored and corrected with the help of pilots or decision-directed methods during reception. In this way, there can be compensation for slow changes like timing drift. However, this approach requires complex tracking mechanism, when tracking each subcarrier separately, and the susceptibility to fading dips, when only a small number of pilots are used (HIPERLAN/2 has only 4 pilots out of 52 subcarriers).

What is needed, therefore, and an object of the present invention, is a timing drift compensation technique which is simple yet highly robust.

BRIEF SUMMARY

A radio receiver system comprises a radio receiver, a receiver sample clock, and a timing correction unit. The radio receiver receives plural modulated radio frequency carriers and produces therefrom a modulated base-band signal in accordance with a sample rate established by the receiver sample clock. The timing correction unit performs, in the frequency domain, a timing drift compensation between a transmitter sample clock and the receiver sample clock to enhance, e.g., demodulation performed by a demodulation unit.

In differing embodiments, the timing drift compensation can be performed in conjunction with systems utilizing differing techniques, such as a channel estimation technique or a signal compensation technique. With each technique embodiment, differing frequency offset estimation techniques can be utilized, such as (for example) preamble directed frequency offset estimation, decision directed frequency offset estimation, or pilot aided frequency offset estimation.

In example embodiments, the receiver includes a demodulation section which comprises the demodulator unit and the timing correction unit. The receiver further comprises a frequency offset estimation unit; a frequency correction unit; a fast Fourier transform (FFT unit; and a channel estimation unit.

In example channel estimation embodiments, the frequency offset estimation unit outputs a frequency offset estimation. The frequency correction unit receives the modulated base-band signal and the frequency offset estimation, and outputs a frequency corrected modulated base-band signal. The fast Fourier transform (FFT) unit receives the frequency corrected modulated base-band signal and outputs, for each subcarrier of the multicarrier, a frequency domain modulated signal. The channel estimation unit uses the frequency corrected modulated base-band signal to generate a frequency domain channel estimate. The frequency domain channel estimate is applied to the timing correction unit. The timing correction unit generates a time corrected frequency domain channel estimate which is applied to the demodulator. The demodulator uses the frequency domain modulated signal and the time corrected frequency domain channel estimate to generate a demodulated signal.

In the channel estimation embodiments, the timing correction unit estimates a timing drift value and compensates for the timing drift value in the frequency domain by applying an appropriate phase factor to a subcarrier to update the frequency domain channel estimate and thereby provide a time corrected frequency domain channel estimate.

In example signal compensated embodiments, the timing drift compensation is performed based on frequency offset estimation and a frequency domain modulated signal. The frequency offset estimation unit outputs a frequency offset estimation. The frequency correction unit receives the modulated base-band signal and the frequency offset estimation and outputs a frequency corrected modulated base-band signal. The fast Fourier transform (FFT) unit receives the frequency corrected modulated base-band signal and, for each subcarrier, outputs a frequency domain modulated signal which is applied to the demodulator. The channel estimation unit uses the frequency corrected modulated base-band signal to generate a channel estimate. The timing correction unit receives the frequency offset estimation and the frequency domain modulated signal, and generates a time corrected frequency domain modulated signal which is applied to the demodulator. The demodulator uses the time corrected frequency domain modulated signal and the channel estimate to generate a demodulated signal.

In the example signal compensated embodiments, the timing correction unit estimates a timing drift value and compensates for the timing drift value in the frequency domain by applying an appropriate phase factor to a subcarrier to update the frequency domain modulated signal, thereby providing a time corrected frequency domain modulated signal.

In one example context of implementation, the plural modulated radio frequency carriers have been modulated using Orthogonal Frequency Division Multiplexing (OFDM). In accordance with one optional mode of the invention, updating of the channel estimate for the timing drift compensation occurs every $M^{th}$ symbol (a value for M being selected in dependence on a particular link adaptation mode).

In another of its aspects, the present invention concerns a mobile station which includes the radio receiver and receiver sample clock, as well as a frequency offset estimation unit. The frequency offset estimation unit receives the modulated base-band signal from the radio receiver and outputs a frequency offset estimation. The mobile station further comprises a controller which uses the frequency offset estimation to determine an estimated relative sample clock offset (the estimated relative sample clock offset being an offset between the receiver sample clock and the transmitter sample clock). In one embodiment, the controller is a sleep mode controller which further determines a timing drift during a sleep period of a predetermined duration. In addition, the sleep mode controller determines one or more of the following: a time until which the receiver is to sleep, and a time until which the receiver is to search for a start of a frame.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 3:
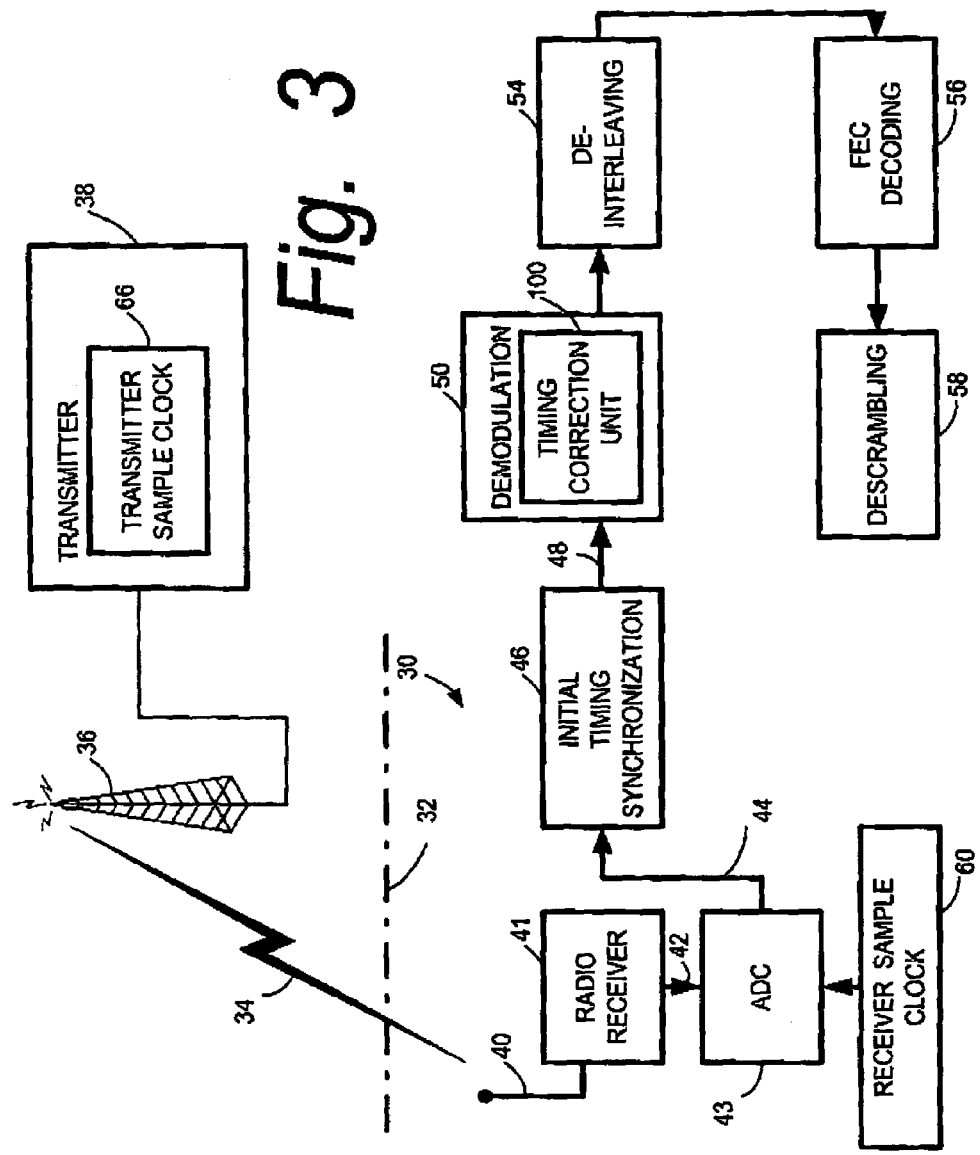
FIG. 3 is a schematic view of an example radio receiver which receives OFDM modulated signals from a transmitter, and which performs timing drift compensation according to the present invention.

FIG. 3 shows an example radio receiver 30 which receives, over air interface 32, a plurality of modulated radio frequency carriers 34 transmitted from antenna 36 of transmitter 38. The example radio receiver 30 can be termed or take the form of mobile stations such as user equipment units (UEs, mobile telephones ("cellular" telephones) and laptops with mobile termination, and thus can be, for example, portable, pocket, hand-held, computer-included, or car-mounted mobile devices which communicate voice and/or data with radio access network. In one example context of implementation, the plural modulated radio frequency carriers 34 have been modulated using Orthogonal Frequency Division Multiplexing (OFDM). For sake of illustration, the modulated radio frequency carriers 34 are transmitted in accordance with the HIPERLAN/2 standard, although the present invention can be utilized wit any OFDM system.

Figure 1:
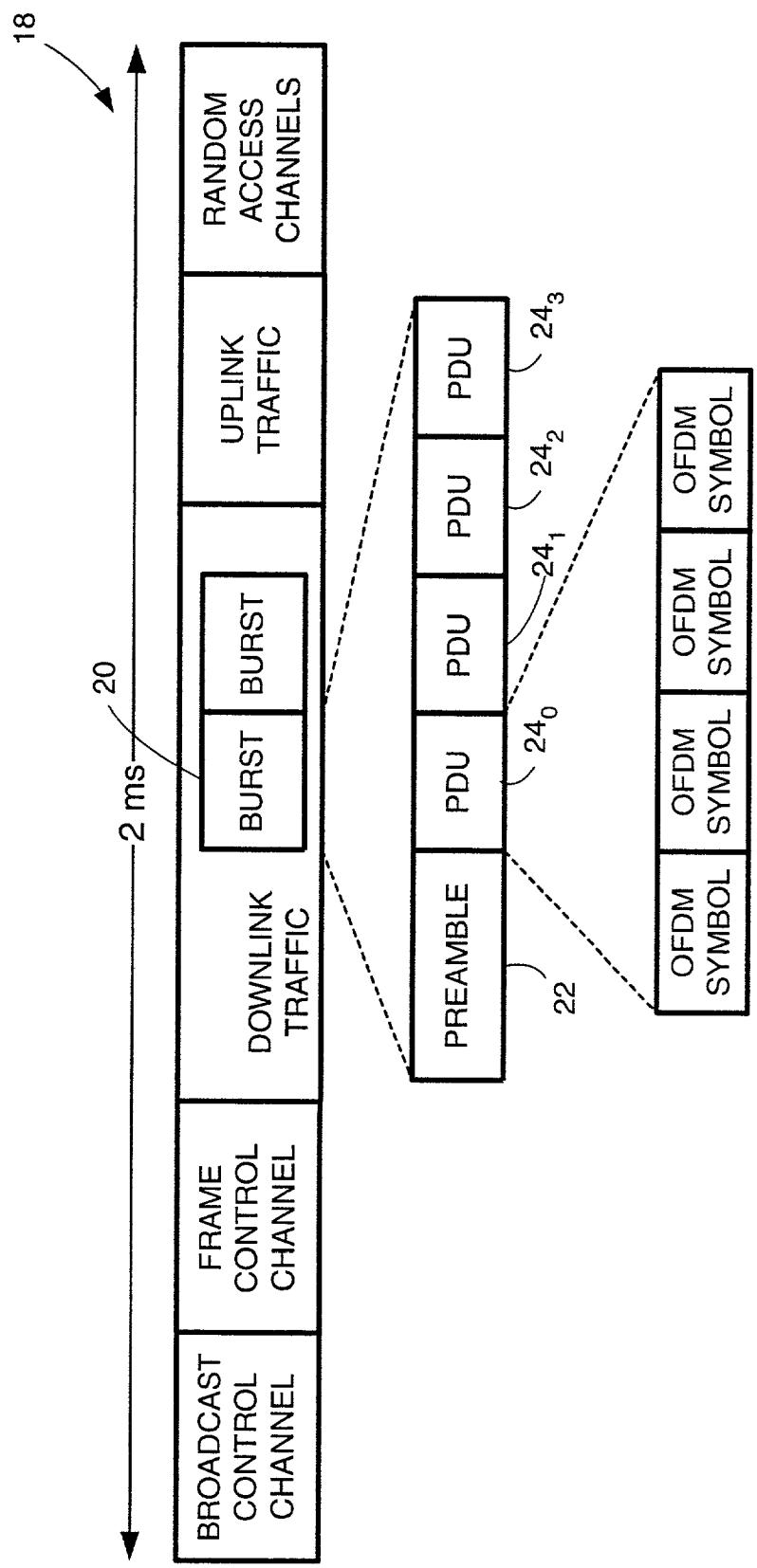
FIG. 1 is a diagrammatic view of frame structure and an exemplary burst transmitted over the air interface of HIPERLAN/2.

As further shown in FIG. 3, the radio receiver 30 includes an antenna 40 which is connected to a radio receiver section 41. The radio receiver section 41 receives the modulated radio frequency carriers 34 and applies an analogue complex modulated base-band signal on line 42 to an analog to digital converter (ADC) 43. The ADC 43 in turn applies a digital (time discrete) complex modulated base-band signal on line 44 (e.g., complex base-band OFDM symbols) to initial timing synchronization section 46. The initial timing synchronization section 46 makes an estimate of the start of each burst of a frame (see FIG. 1). The digital complex modulated base-band signal is applied to demodulation section 50 which, for each subcarrier, outputs a demodulated but interleaved signal. The output of demodulation section 50 is applied in sequence to de-interleaving section 54, FEC decoding section 56, and descrambling section 58.

ADC 43 performs the sampling of the received signal. The sampling performed by ADC 43 is at a sampling rate governed by receiver sample clock 60. To this end, FIG. 3 shows radio receiver 30 as further comprising receiver sample clock 60 being connected to ADC 43. Sampling of the signal in receiver 30 is thus performed at the rate of receiver sample clock 60, whereas processing of the signal was performed by transmitter 38 in accordance with a transmitter sample clock 66.

A potential timing drift for which the present invention compensates occurs when the signal is converted by ADC 43 from the analogue, time continuous, domain to the digital, time discrete, domain, i.e., when the signal is sampled. The timing drift is inherent in the signal once it is sampled. In a DSP implementation the samples can be stored in a memory. Once the entire burst is stored, the demodulator section 50 processes it, e.g., at a rate much greater than the sample rate.

As explained in more detail herein in the context of differing example embodiments, the demodulation section 50 includes a demodulation unit which performs a demodulation of a modulated subcarrier signal obtained from the modulated base-band signal. In view of a potential timing drift between receiver sample clock 60 and the transmitter sample clock 66, the demodulation section 50 includes a timing correction unit or timing correction function 100 which performs, in the frequency domain, a timing drift compensation (to compensate for a timing drift between the transmitter sample clock and the receiver sample clock), thereby enhancing the demodulation at the radio receiver 30.

In differing embodiments, the timing drift compensation can be performed in accordance with various techniques. Example, non-limiting, representative techniques hereinafter described include timing drift compensation based on channel estimation and signal-applied timing drift compensation (i.e., a signal compensated technique). Moreover, with each embodiment, differing frequency offset estimation techniques can be utilized, such as (for example) preamble directed frequency offset estimation, decision directed frequency offset estimation, or pilot aided frequency offset estimation.

For each such example embodiment, the receiver 30 includes a demodulation section 50 section which comprises the demodulator unit and the timing correction unit. As utilized herein, the non-suffixed reference numerals 50 and 100 represent a generic demodulation section 50 and a generic timing correction unit 100, respectively. Similarly numbered elements of the various embodiments have essentially identical functions respecting the timing correction aspects of the present invention.

Figure 4:
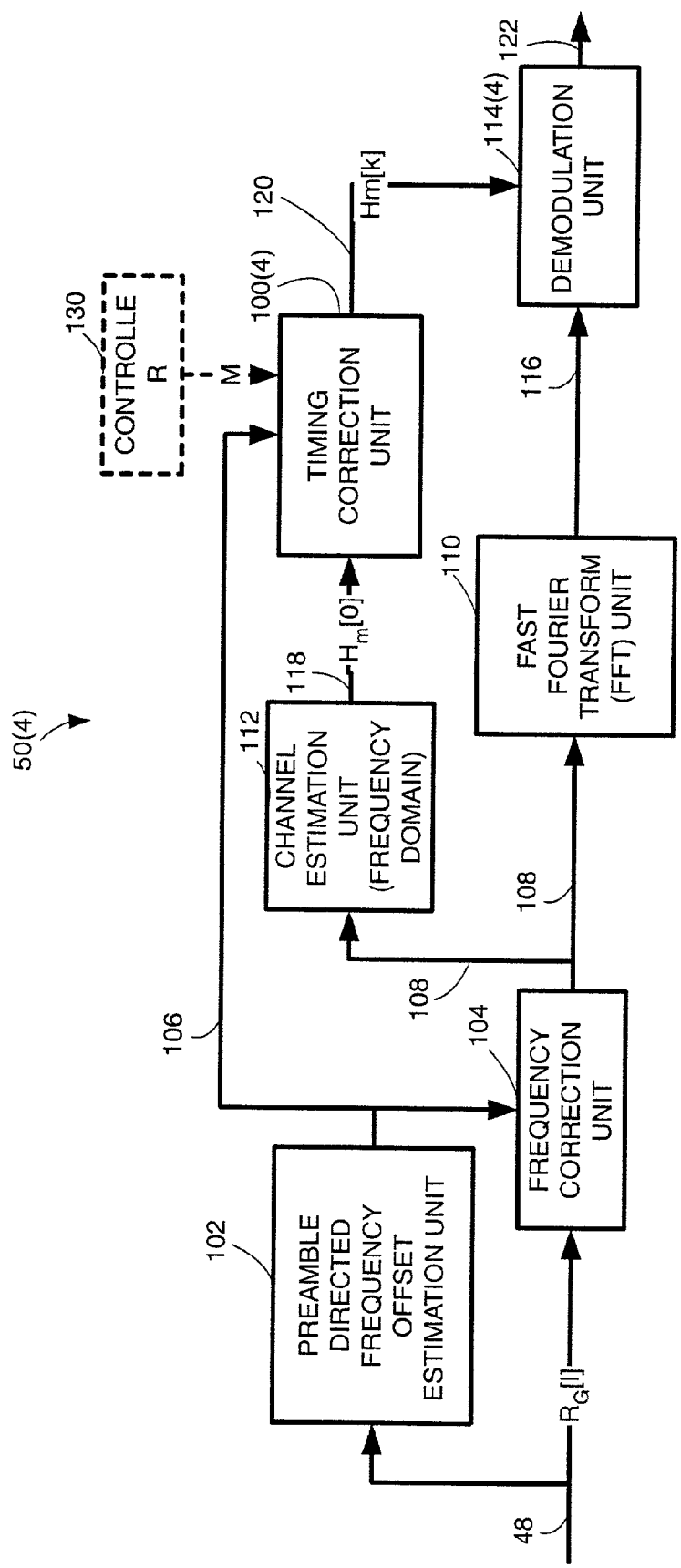
FIG. 4 is a schematic view of a demodulation section of a radio receiver which utilizes channel estimation in conjunction with timing drift compensation, and which uses a preamble directed frequency offset estimation.

FIG. 4 illustrates example basic components of a radio receiver 30 having a demodulation section 50(4) which utilizes channel estimation and preamble directed frequency offset estimation. In FIG. 4, the digital complex modulated base-band signal $R_G[1]$ obtained on line 48 from initial timing synchronization section 46 is applied both to preamble directed frequency offset estimation unit 102 and frequency correction unit As is understood by those skilled in the art, a frequency offset occurs in view of the limited accuracy of frequency generation at the radio transmitter and/or the receiver. Such frequency offset destroys the orthogonality of the subcarriers of the OFDM, and accordingly must be estimated and removed from the received signal in order not to degrade performance.

Accordingly, the preamble directed frequency offset estimation unit 102 generates a frequency offset estimation which is output on line 106 to frequency correction unit 104 and timing correction unit 100. The preamble directed frequency offset estimation unit 102 uses the preamble (see preamble 22 in FIG. 1 and FIG. 2), and needs to know when the preamble starts, in order to generate the frequency offset estimation. In this regard, it is assumed that the signal $R_G[1]$ on line 48 has been aligned (e.g., by initial timing synchronization section 46) so that the preamble starts at the first sample coming into preamble directed frequency offset estimation unit 102. The preamble directed frequency offset estimation unit 102 can generate the frequency offset estimation using any of various techniques, including autocorrelation (which exploits periodicity of the preamble) and cross-correlation (in which, e.g., a received preamble is cross-correlated with a stored reference). In essence, in the preamble the parts $22_2$ and $22_3$ are a repetition of the same sequence, and by correlating them, e.g., performing autocorrelation, the frequency offset can be estimated. The frequency correction unit 104 uses the frequency offset estimation obtained from preamble directed frequency offset estimation unit 102 to generate a frequency corrected modulated base-band signal depicted on lines 108 in FIG. 4.

The demodulation section 50(4) further comprises a fast Fourier transform (FFT) unit 110; a channel estimation unit 112; the timing correction unit 100(4); and a demodulation unit 114(4). The fast Fourier transform (FFT) unit 110 receives the frequency corrected modulated base-band signal applied thereto on line 108, and outputs, for each subcarrier, a frequency domain modulated signal depicted by line 116. The channel estimation unit 112 uses the frequency corrected modulated base-band signal applied thereto on line 108 to generate a frequency domain channel estimate. The frequency domain channel estimate, depicted by line 118 and the notation $H_m[0]$ in FIG. 4, is applied to the timing correction unit 100(4). The timing correction unit 100 generates a time corrected frequency domain channel estimate which is depicted by the notation $H_m[k]$ and applied on line 120 to the demodulator 114(4). The demodulator 114(4) uses the frequency domain modulated signal (obtained from fast Fourier transform (FFT) unit 110) and the time corrected frequency domain channel estimate (obtained from timing correction unit 100(4)) to generate a demodulated signal. The demodulated signal is output on line 122 to de-interleaving section 54 (see FIG. 3).

In the channel estimation embodiment represented by FIG. 4, the timing correction unit 100(4) estimates a timing drift value $t_0$ and compensates for the timing drift value in the frequency domain by applying an appropriate phase factor $\phi_{m,k}$ to a subcarrier to update the frequency domain channel estimate and thereby provide a time corrected frequency domain channel estimate $H_m[k]$ on line 120 to demodulation unit 114(4). An explanation undergirding such operation of timing correction unit 100 ensues.

As mentioned earlier, a time displacement $T_{off}$ of a function $f(t)$ in the time-domain gives a linear phase factor of the corresponding Fourier transform as indicated in Equation 2.

$$\phi = \omega \cdot T_{off} \qquad \text{Equation 2}$$

This is compared to the Fourier transform $F(T)$ of the original function $f(t)$ according to Equation 3.

$$f(t-T_{off}) \rightarrow \exp(-j\omega \cdot T_{off}) \cdot F(\omega) \qquad \text{Equation 3}$$

Since there is a timing drift the displacement, $T_{off}$ grows linearly with time according to Equation 4.

$$T_{off} = t_0 \cdot t \qquad \text{Equation 4}$$

In Equation 4, $t_0$ is the relative sample clock offset, −40 ppm<$t_0$<40 ppm.

Assuming that $T_{off}$ changes very slowly, Equation 3 still holds approximately. The phase factor can then be written as shown in Equation 5.

$$\phi = \omega \cdot t_0 \cdot t \qquad \text{Equation 5}$$

The phase factor can also be written in terms of symbol number k and subcarrier index m according to Equation 6.

$$\phi_{m,k} = \frac{(T_s \cdot (k-1) + T_{init}) \cdot t_0}{T} \cdot \frac{m}{32} \cdot \pi \qquad \text{Equation 6}$$

In Equation 6, m is the subcarrier index for the used subcarriers, $-26 \leq m \leq 26$; k is the time index measured in OFDM symbols, k=1 being the first data symbol, i.e. the first symbol after the preamble, k=1, 2, 3 . . . ; $T_s$ is the OFDM symbol time, $T_s$=4 μs (80 samples); T is the sample time, T=50 ns; and $T_{init}$ is the time between the reference time t=0 and the first data symbol.

As shown by Equation 7, the timing drift estimate $t_0$ can be derived from the frequency offset estimate since the radio frequency and the sample clock are derived from the same reference source, according to the HIPERLAN/2 standard. The frequency offset estimate is taken anyway at the beginning of the burst to do frequency synchronization, so this does not require extra calculations.

$$t_0 = \frac{f_{off}}{f_c} \qquad \text{Equation 7}$$

In Equation 7, $f_{off}$ is the absolute frequency offset estimate in Hz, and $f_c$ is the carrier frequency in Hz.

Once the timing drift is estimated, it can be compensated for in the frequency domain by applying the right phase factor to each subcarrier. This is done after the fast Fourier transform (FFT) and prior to the demodulation.

The embodiment of FIG. 4 reflects the method of updating the channel estimate according to Equation 8.

$$H_m[k] = \exp(j \cdot \phi_{m,k}) \cdot H_m[0] \qquad \text{Equation 8}$$

In Equation 8, $H_m[k]$ is the corrected complex frequency domain channel estimate of the $m^{th}$ subcarrier of the $k^{th}$ data carrying OFDM symbol, and $H_m[0]$ is the initial complex frequency domain channel estimate of the $m^{th}$ subcarrier.

From the foregoing it is understood that, in the embodiment of FIG. 4, the timing correction unit 100(4) updates the channel estimate using the relationship $H_m[k] = \exp(j \cdot \phi_{m,k}) \cdot H_m[0]$, wherein: $H_m[k]$ is the time offset corrected channel estimate for a time index measured in data symbols k; $H_m[0]$ is the initial channel estimate; $\phi_{m,k}$ is the phase factor; and wherein m is a subcarrier index for used subcarriers. The phase factor $\phi_{m,k}$ is in turn defined by $$\phi_{m,k} = \frac{(Ts \cdot (k-1) + T_{init}) \cdot t_0}{T} \cdot \frac{m}{32} \cdot \pi,$$

wherein: m is the subcarrier index; k is the time index measured in data symbols; $T_s$ is a symbol time; T is a sample time; $T_{init}$ is a time between a reference time and a first data symbol; and $t_0$ is the timing drift value. The timing drift value $t_0$ is derived from $$t_0 = \frac{f_{off}}{f_c}$$

wherein $f_{off}$ is an absolute frequency offset estimate in Hz, and $f_c$ is a carrier frequency in Hz.

The update performed by timing correction unit 100(4) to compensate for the timing drift need only be done every $M^{th}$ symbol in order to save computations since the timing drift is a rather slow process. To this end, FIG. 4 shows an optional variation the inclusion in FIG. 4 of a controller 130. Controller 130, shown by broken lines to reflect its optional inclusion, coordinates the action of timing correction unit 100(4) so that the updating of the channel estimate for the timing drift compensation occurs every $M^{th}$ symbol. FIG. 4 particularly shows a signal M emanating from controller 130 to timing correction unit 100(4), advising for how many symbols the same channel estimate is to be utilized. The update period M can, for instance, depend on the link adaptation mode, as the higher, more sensitive modulation schemes will require a faster updating.

Thus, the controller 30 applies $H_m[1]$ for the first M symbols, $H_m[M+1]$ for the next M symbols and so on. Mathematically, this updating has the effect shown in Equation 9, where n∈N (natural numbers) and p is an element of [1, M]. The Mth trigger signal is thus applied to the timing correction unit 100, telling it to update the channel estimate.

$$H_m[n \cdot M + p] = \exp(j \cdot \phi_{m,n \cdot M+1}) \cdot H_m[0] \qquad \text{Equation 9}$$

Figure 5:
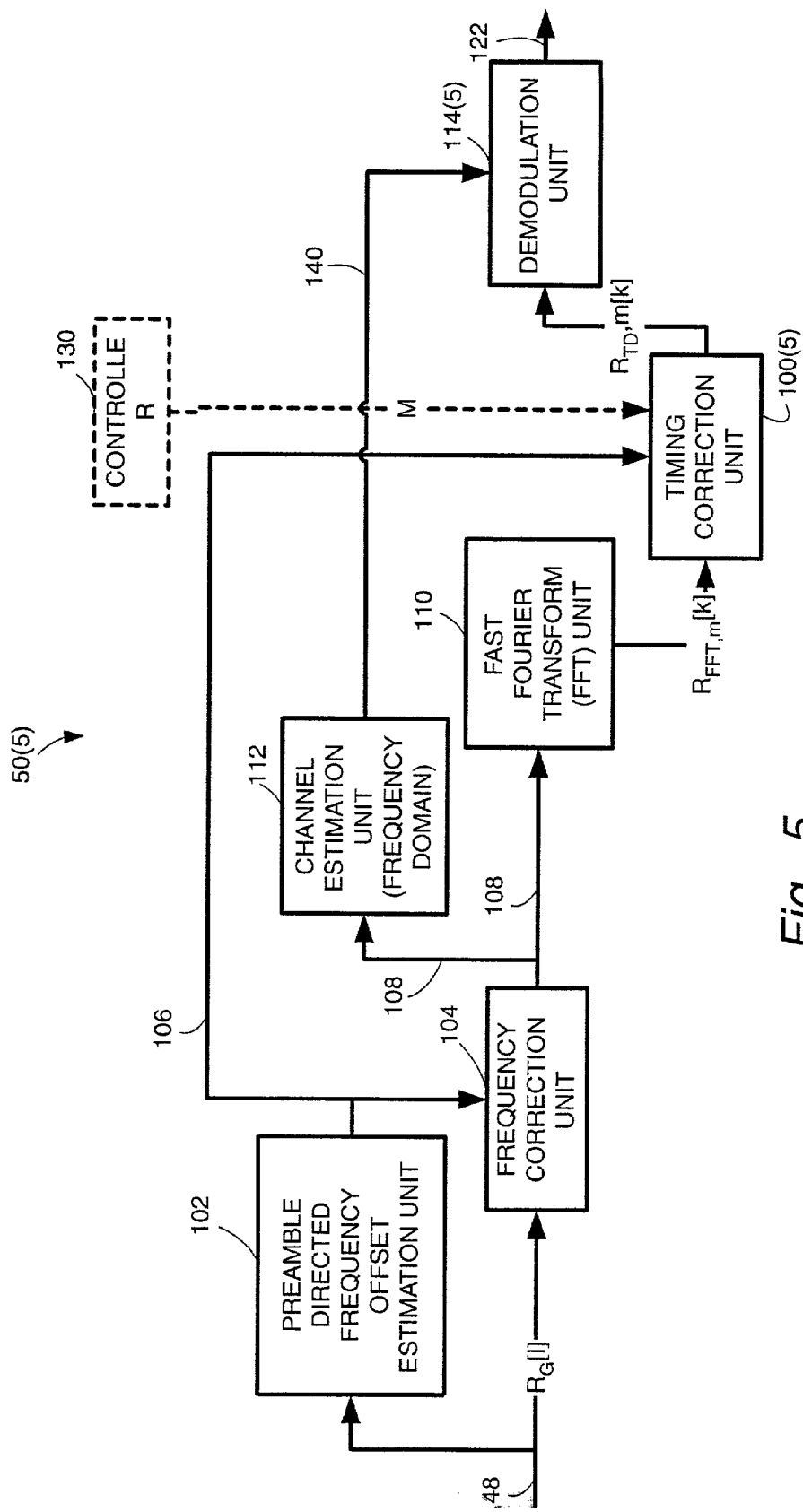
FIG. 5 is a schematic view of a demodulation section of a radio receiver which utilizes signal compensation in conjunction with timing drift compensation, and which uses a preamble directed frequency offset estimation.

FIG. 5 illustrates example basic components of a radio receiver 30 having a demodulation section 50(5) which applies compensation to the signal and utilizes preamble directed frequency offset estimation. In the example signal compensated embodiment, the timing drift compensation is performed based on frequency estimation and applied to the frequency domain modulated signal. Where appropriate, reference numerals of components of the FIG. 5 embodiment which are basically similar to the corresponding components of the FIG. 4 embodiments are the same as in FIG. 4

As in the FIG. 4 embodiment, in FIG. 5 preamble directed frequency offset estimation unit 102 receives the modulated base-band signal $R_G[I]$ and outputs (on line 106) a frequency offset estimation. The frequency correction unit 104 receives the modulated base-band signal and the frequency offset estimation and outputs (on line 108) a frequency corrected modulated base-band signal. The fast Fourier transform (FFT) unit 110 receives the frequency corrected digital complex modulated base-band signal and, for each subcarrier, outputs a frequency domain (separated) modulated signal $R_{FFT,m}[k]$ which is applied to timing correction unit 100(5).

The channel estimation unit 112 of FIG. 5 uses the frequency corrected modulated base-band signal to generate a frequency domain channel estimate which is applied on line 140 to demodulation unit 114(5). In the FIG. 5 embodiment, the timing correction unit 100(5) receives the frequency domain modulated signal $R_{FFT,m}[k]$ and the frequency offset estimation (on line 106). The timing correction unit 100 (5) generates a time corrected frequency domain modulated signal $R_{TD,m}[k]$ which is applied to the demodulator 114(5). The demodulation unit 114(5) uses the time corrected frequency domain modulated signal $R_{TD,m}[k]$ and the channel estimate to generate a demodulated signal which is applied on line 122 to de-interleaving section 54.

Thus, in the example signal compensation embodiment of FIG. 5, the timing correction unit 100(5) estimates a timing drift value $t_0$ and compensates for the timing drift value in the frequency domain by applying an appropriate phase factor $\phi_{m,k}$ to a subcarrier to update the frequency domain modulated signal, thereby providing a time corrected frequency domain modulated signal $R_{TD,m}[k]$ to demodulation unit 114(5).

The method implemented by the embodiment of FIG. 5 thus corrects the signal rather than the channel estimate, utilizing Equation 10.

$$R_{TD,m}[k] = \exp(-j\phi_{m,k}) \cdot R_{FFT,m}[k] \qquad \text{Equation 10}$$

In Equation 10, $R_{TD,m}[k]$ is the complex frequency domain signal compensated for timing drift of the $m^{th}$ subcarrier of the $k^{th}$ data carrying OFDM symbol, and $R_{FFT,m}[k]$ is the complex frequency domain signal just after the FFT of the $m^{th}$ subcarrier of the $k^{th}$ data carrying OFDM symbol. As in the FIG. 4 embodiment, the phase factor is understood with reference to Equation 5 and Equation 6, and the timing drift estimate $t_0$ is understood, e.g., with reference to Equation 7.

Figure 6:
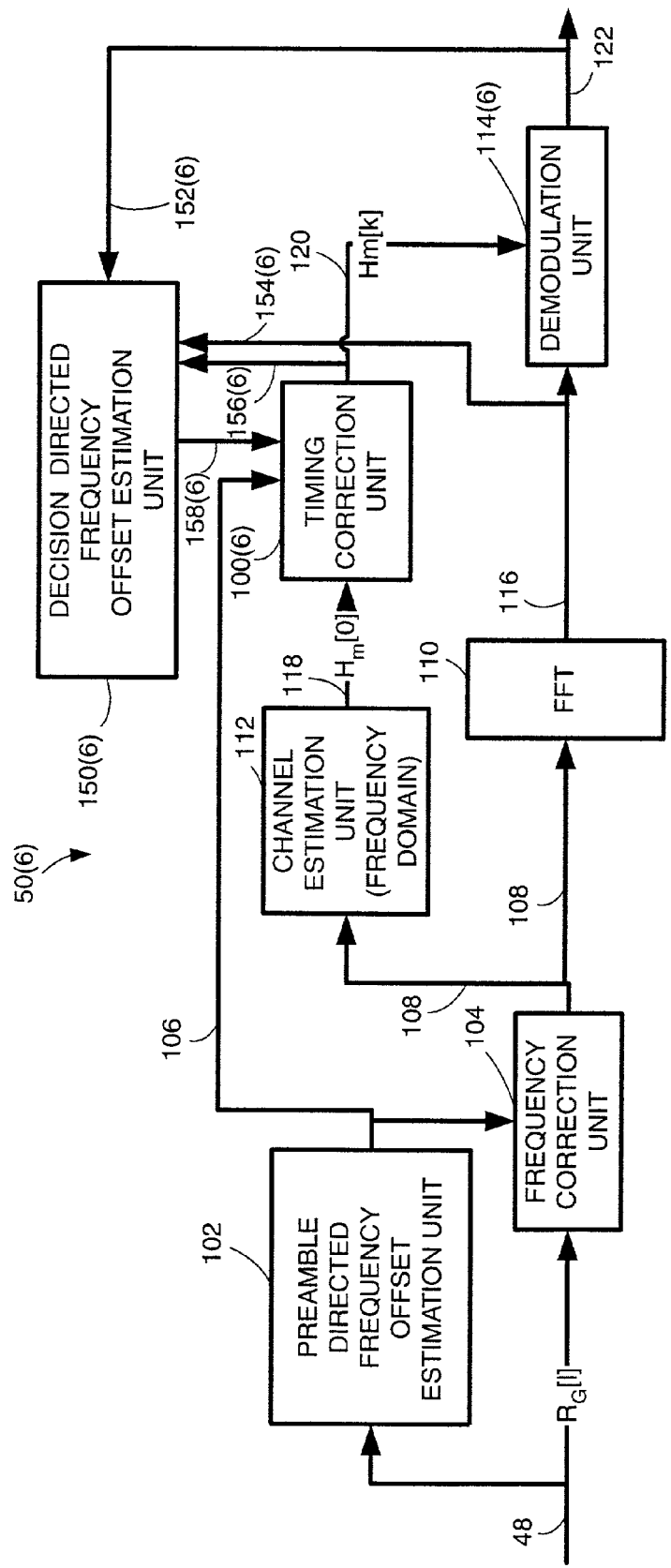
FIG. 6 is a schematic view of a demodulation section of a radio receiver which utilizes channel estimation in conjunction with timing drift compensation, and which uses a decision directed frequency offset estimation.

Instead of using the frequency offset estimate, the timing drift to can be also estimated by a decision directed and/or pilot aided method. For example, FIG. 6 illustrates example basic components of a radio receiver 30 having a demodulation section 50(6) which utilizes channel estimation and decision directed frequency offset estimation. Where appropriate, reference numerals of components of the FIG. 6 embodiment which are basically similar to the corresponding components of the FIG. 4 embodiments are the same as in FIG. 4. Notably in FIG. 6 the demodulation section 50(6) includes a decision directed unit, also referred to herein as decision directed frequency offset estimation unit 150(6).

Figure 7:
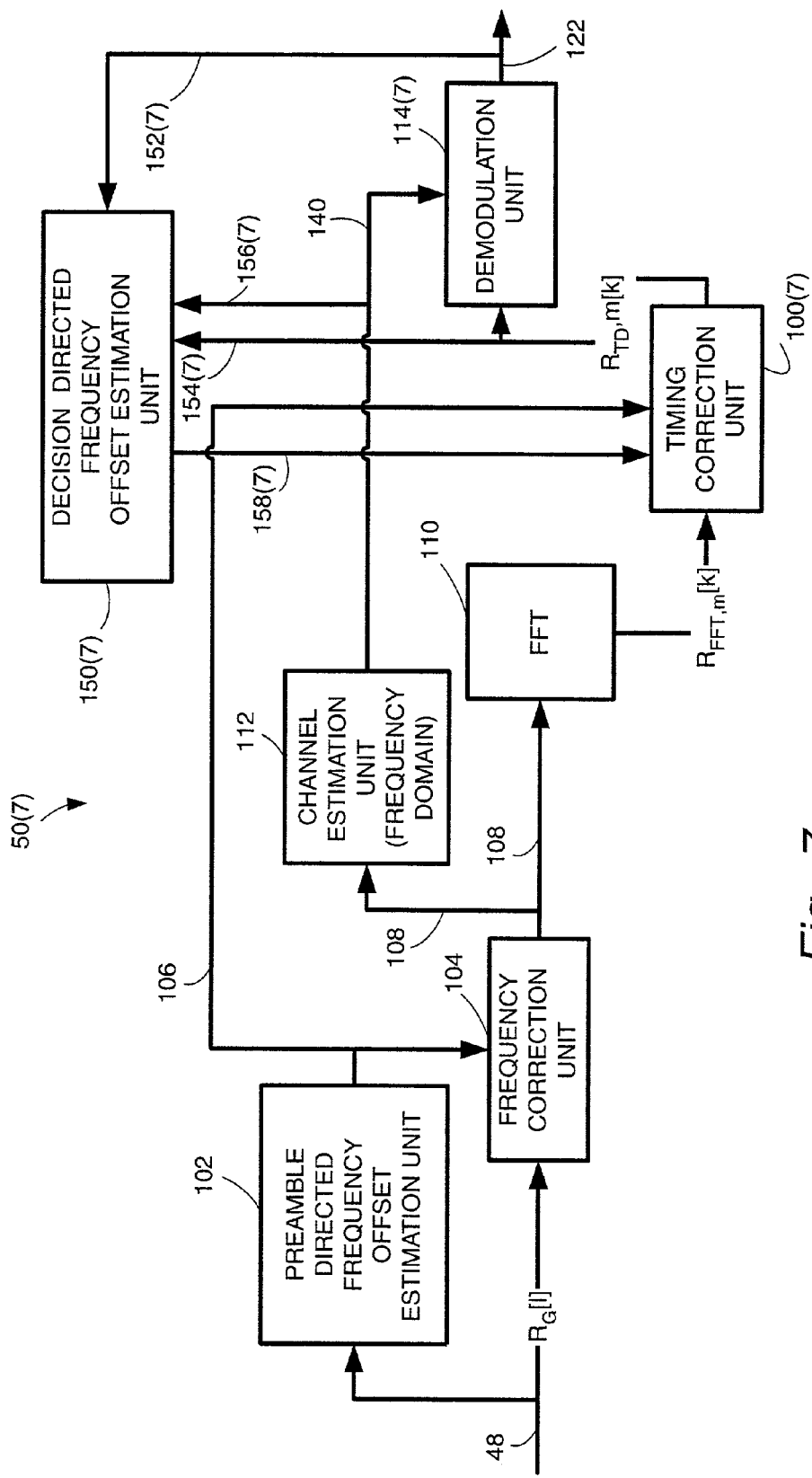
FIG. 7 is a schematic view of a demodulation section of a radio receiver which applies timing drift compensation to a signal, and which uses a decision directed frequency offset estimation.

As another example, FIG. 7 illustrates example basic components of a radio receiver 30 having a demodulation section 50(7) which applies the compensation to the signal and which utilizes decision directed frequency offset estimation. Again, where appropriate, reference numerals of components of the FIG. 7 embodiment which are basically similar to the corresponding components of the FIG. 5 embodiments are the same as in FIG. 5. The demodulation section 50(7) of the FIG. 7 embodiment includes a decision directed unit (decision directed frequency offset estimation unit 150(7)).

Figure 8:
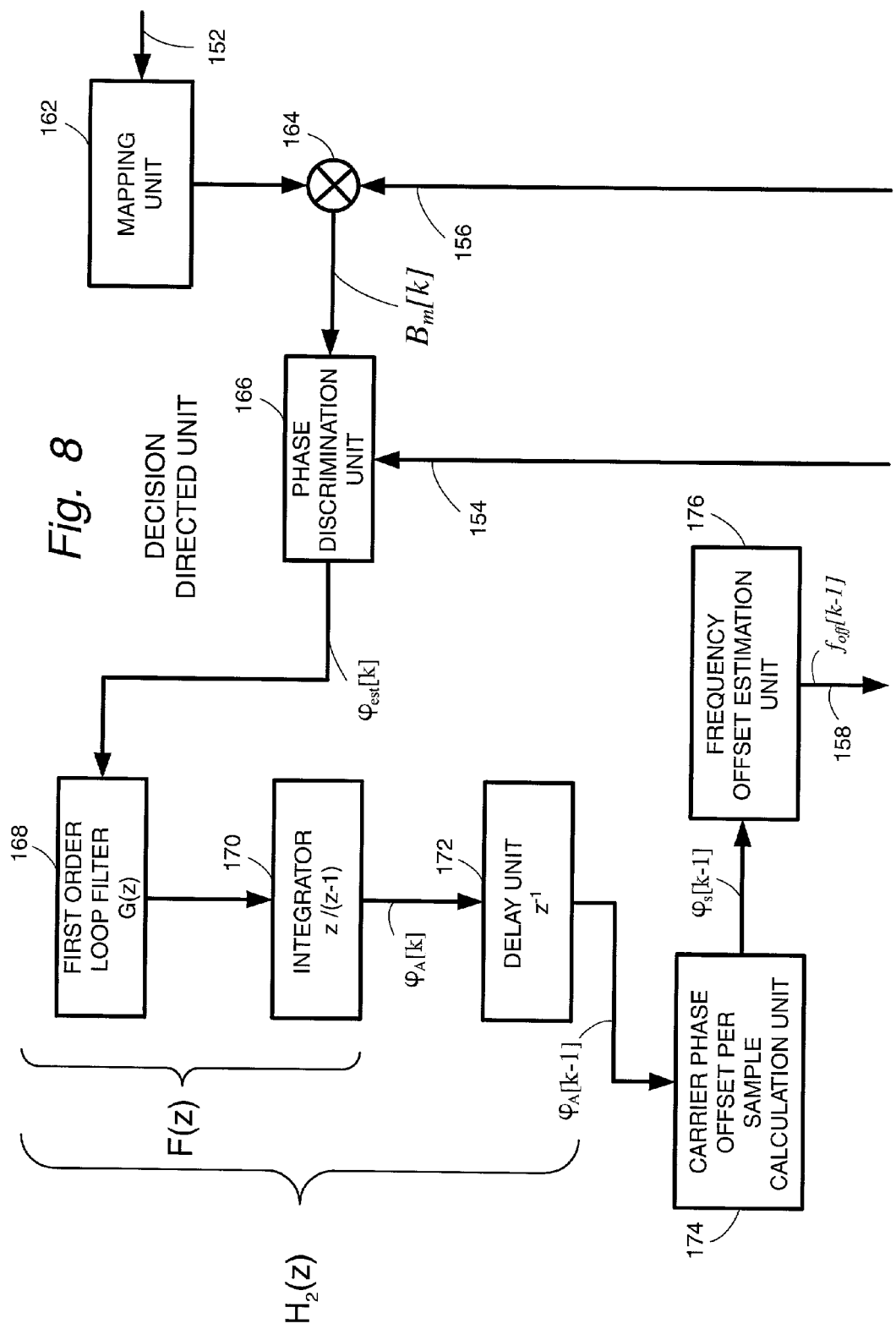
FIG. 8 is a flowchart showing basic example actions performed by a decision directed unit according to an embodiment of the invention.

The principles of operation and details of the decision directed frequency offset estimation unit 150(6) of FIG. 6 and the decision directed frequency offset estimation unit 150(7) of FIG. 7 are understood with respect to a representative example decision directed unit 150 illustrated in FIG. 8. In the FIG. 6 and FIG. 7 embodiments, for purposes of the present invention the decision directed unit 150(6) and 150(7) each have three inputs and one output. The three inputs are shown as lines having the base reference numerals 152, 154, and 156, while the output is carried on a line having base reference numeral 158. For example, decision directed unit 150(6) of FIG. 6 has a first input on line 152(6) from the output of demodulation unit 114(6); a second input on line 156(6) from the output of timing correction unit 100(6); a third input on line 154(6) from the output of fast Fourier transform (FFT) unit 110(6); and an output applied on line 158(6) to timing correction unit 100(6). The decision directed unit 150(7) of FIG. 7 has similar connections, with the exception of its second input line 156(7) emanating from an output of channel estimation unit 112(7) and its third input line 154(7) emanating from timing correction unit 100(7).

It will be recalled that the timing correction unit 100(4) of FIG. 4 and the timing correction unit 100(5) of FIG. 5 use a preamble directed frequency offset estimate $f_{off}$ in order to determine the timing drift $t_0$. In the decision directed embodiments of FIG. 6 and FIG. 7, on the other hand, the decision directed unit 150(6) and decision directed unit 150(7), respectively, supply the timing correction unit 100(6) and timing correction unit 100(7) with the frequency offset estimate $f_{off}$ as below described.

The decision directed unit 150 as shown in FIG. 8 comprises a mapping unit 162 which receives an input from demodulation unit 114 on line 152. A first input terminal of multiplier 164 receives a first input on line 156 (from timing correction unit 100 of the FIG. 6 embodiment and from channel estimation unit 112 of the FIG. 7 embodiment) and a second input from the output of mapping unit 162. The output of multiplier 164, shown as Bm[k] in FIG. 8, is applied as a first input to phase discrimination unit 166. A second input to phase discrimination unit 166 is received on input line 154 from FFT unit 110 of the FIG. 6 embodiment and from timing correction unit 100 of the FIG. 7 embodiment.

The output of phase discrimination unit 166 (shown as $\phi_{est}[k]$ in FIG. 8) is applied to first order loop filter 168. An output of first order loop filter 168 is connected to integrator 170. The output of integrator 170, shown as $\phi_A[k]$ in FIG. 8, is applied to delay unit 172. The output of 172, shown as $\phi_A[k-1]$ in FIG. 8, is applied to carrier phase offset per sample calculation unit 174. The output of carrier phase offset per sample calculation unit 174, shown as $\phi_s[k-1]$ in FIG. 8, is applied to frequency offset estimation unit 176. The output of frequency offset estimation unit 176, i.e., $f_{off}[k-1]$, is output on line 158 to timing correction unit 100.

The decision directed unit 150 receives a signal comprising a stream of data symbols, and calculates an estimated phase offset for each data symbol as a function of the respective data symbol. Further, as a function of the estimated phase offset of a data symbol and the estimated phase offset of a data symbol preceding the latter data symbol, a predicted phase offset is calculated for the data symbol in question. From the predicted phase offset the decision directed unit 150, and particularly frequency offset estimation unit 176, calculates the frequency offset estimate $f_{off}$. From the frequency offset estimate $f_{off}$, the timing correction unit 100 can calculate the timing drift $t_0$, e.g., using Equation 7.

Figure 2:
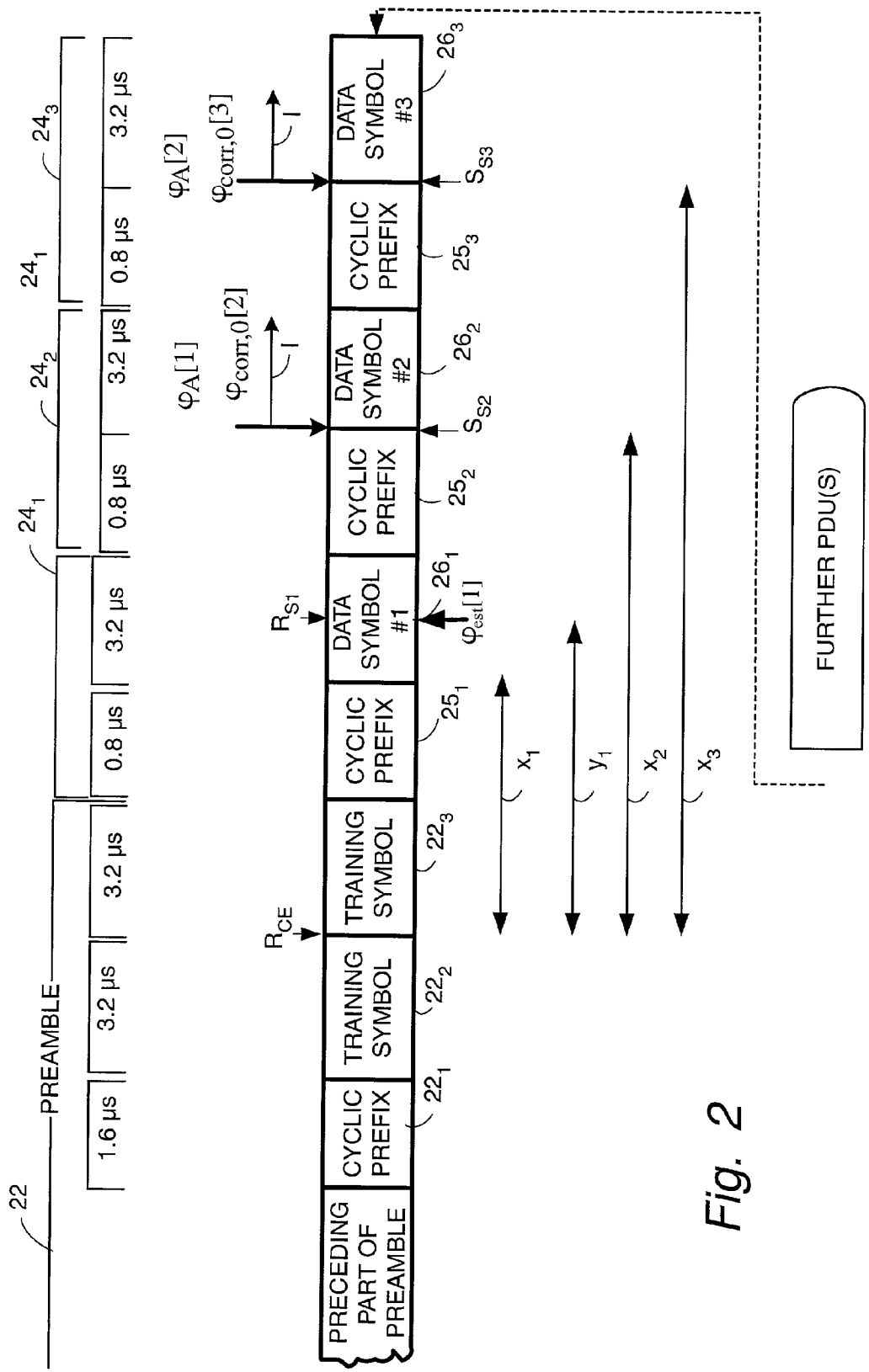
FIG. 2 is a more detailed diagrammatic view of portions of an exemplary burst of FIG. 1.

FIG. 2 illustrates the structure of a received sample stream including the phase reference points. The OFDM symbols $22_2$ and $22_3$ of the C-preamble are used for a channel estimation and a reference phase estimation (both OFDM symbols $22_2$ and $22_3$ being used for channel estimation and reference phase). Prior to the actual channel estimation, the two C-preamble symbols are added to obtain a higher noise suppression. As a result of this averaging process, the phase reference point of the channel estimation $R_{CE}$ is positioned in the middle of the OFDM symbols $22_2$ and $22_3$ in the time domain. The actual data stream of data symbols (i.e. OFDM symbols) follows the C-preamble. In the following the actual data stream is also called burst, wherein every burst comprises several OFDM symbols preceded by a C-preamble.

Among its other functions, the decision directed unit 150 estimates the phase offset of the first data OFDM symbol S1. Assuming a constant frequency offset, the estimated phase offset ($\phi_{est}[1]$) corresponds to the phase offset in the middle $R_{S1}$ of the OFDM symbol S1 in the time domain. The difference between the reference points $R_{CE}$ and $R_{S1}$ in the time domain is denoted by $y_1$ in FIG. 2. On the basis of the phase offset $\phi_{est}[1]$, the frequency tracker calculates the derotating phase $\phi_{corr,0}[2]$. The derotating phase $\phi_{corr,0}[2]$ corresponds with a phase offset $\phi_A[1]$ at the beginning $S_{S2}$ of the second OFDM symbol S2. This phase offset $\phi_A[1]$ is a predicted phase offset for the second OFDM symbol S2. In the time domain, the differences between the reference point $R_{CE}$ and the beginning $S_k$ of the OFDM symbols constituting a phase reference point for each OFDM symbol $S_k$ is denoted by $X_k$. The parameters $x_k$ and $y_1$ are used to determine the optimum coefficients for the phase locked loop of the frequency tracker. Further, it is noted that the so-called predicted phase offset $\phi_A[k-1]$ represents the phase increment from the phase reference point $R_{ce}$ of the C-preamble to the beginning $S_{Sk}$ of the k-th OFDM symbol $S_k$. The phase correction offset $\phi_{corr,1}[k]$ represents the phase increment from the phase reference point $R_{ce}$ to the 1-th sample of the k-th OFDM symbol $S_k$.

As employed herein, the index "k" indicates the number of symbols in a burst, while the index "C" is used to distinguish the signals. The index "1" represents the number of the samples derived for each OFDM symbol.

The output subcarrier demodulation unit 114 is remodulated by mapping unit 162 to obtain the remodulated symbols $A_m[k]$. The mapping unit 162 performs the remodulation of the output u[k] by a mapping performed according to the HIPERLAN/2 standard. The remodulated symbols $A_m[k]$ are multiplied by multiplier 164 with the input on line 156 (e.g., the channel estimation $H_m[k]$ of each subcarrier for the FIG. 8 embodiment). For the FIG. 8 embodiment, therefor, the multiplication performed by multiplier 164 is as shown in Equation 11 to obtain a weighted symbol estimation $B_m[k]$ on each subcarrier. In Equation 11, "m" denotes the number of subcarriers.

$$B_m[k]=A_m[k]H_m[k]$$

The phase discrimination between received signal samples $R_m[k]$ and the weighted symbol estimation $B_m[k]$ yields the phase estimation $\phi_{est}[k]$ outputted by phase discrimination unit 166. The phase estimation $\phi_{est}[k]$ is further computed by the filter F(z), which comprises a first order loop filter 168 having a transfer function described by Equation 12. Equation 13 describes F(z). Equation 14 defines a calculation of the output of the filter F(z), wherein $\phi_A[0]$ and $\phi_A[k-1]$ are set to be zero for initialization purposes $$G(z) = \frac{a \cdot z + b}{(z-1)} \qquad \text{Equation 12}$$

$$F(z) = z \cdot \frac{a \cdot z + b}{(z-1)^2} \qquad \text{Equation 13}$$

$$\phi_A[k]=a\cdot\phi_{est}[k]+b\cdot\phi_{est}[k-1]+2\cdot\phi_A[k-1]-\phi_A[k-2] \qquad \text{Equation 14}$$

The output $\phi_A[k-1]$ representing the phase increment from the phase reference point $R_{ce}$ of the C-preamble to the beginning $S_{Sk}$ of the k-th OFDM symbol Sk is forwarded to delay unit 172. Thus, a filter $H_2[z]$ being of a second order type is obtained, wherein the transfer function of the filter $H_2[z]$ as open loop is described by Equation 15.

$$H_2(z) = \frac{a \cdot z + b}{(z-1)^2} \qquad \text{Equation 15}$$

The output $\phi_A[k-1]$ of the filter F(z) corresponds with the phase which would be existent in the k-th OFDM symbol Sk if no frequency tracking was applied for a received OFDM signal exhibiting a low noise. For the sake of simplicity, in the following, a constant frequency offset is assumed. However, the following derivation is still valid when the constant frequency offset corresponds to the mean frequency offset over a certain time, which is typical one OFDM symbol, in case of a varying frequency offset e.g. due to phase noise. As a result, the phase offset $\phi_s[k]$ per signal sample outputted by a means 24 is given by Equation 16.

$$\varphi_s[k] = \frac{\varphi_A[k]}{x_{k+1}} \qquad \text{Equation 16}$$

Since the phase $\phi_A[k]$ represents a predicted phase offset for a respective OFDM symbol, the sample phase offset $\phi_s[k]$ is also a predicted phase offset since it is calculated as a function of the phase $\phi_A[k]$. In order to take in account the underlying predictive property, the sample phase offset $\phi_s[k]$ is obtained by a division of the phase offset $\phi_A[k]$ by the number $X_{k+1}$ of samples between the reference point $R_{CE}$ and the beginning $S_{Sk+1}$ in the time domain, of the OFDM symbol $S_{k+1}$ comprising the samples in question.

The predicted sample phase offset $\phi_s[k]$ is applied to the frequency offset estimation unit 176. The frequency offset estimation unit 176 performs a calculation of the frequency offset using Equation 17. In Equation 17, T is the sample time.

$$f_{off}=\phi_s[k-1]/2/\pi/T \qquad \text{Equation 17}$$

As indicated previously, the timing correction unit 100, using the frequency offset $f_{off}$ provided by decision directed unit 150, can compute the timing drift $t_0$ in accordance with Equation 7. Thus, the decision directed unit 150(6) and the decision directed unit 150(7) provide alternate ways to provide the timing drift $t_0$, without having to rely on preamble directed frequency offset estimation.

The foregoing describes the case if frequency correction unit 104 is not applied. For the case in which frequency correction unit 104 is applied, the frequency offset estimated by the preamble directed frequency offset estimation unit 102 must be added to the frequency offset calculated by the decision directed unit 150. In this case the decision directed frequency offset estimation of unit 150 is an additional means to refine the preamble directed frequency offset estimation unit 102. As indicated in FIG. 6 and FIG. 7, the timing correction unit has connections to preamble directed frequency offset estimation unit 102 and to decision directed frequency offset estimation unit 150, meaning that timing correction unit 100 gets two values for the frequency offset, which must be added. Therefore, Equation 7 must be modified for this case that two values for $f_{off}$ are obtained, one value ($f_{offpreamble}$) coming from unit preamble directed frequency offset estimation 102 and another value ($f_{offdecision}$) coming from decision directed frequency offset estimation unit 150, and taken into account when calculating $t_0$ according to the following: $t_0=(f_{offpreamble}+f_{offdecision})/f_c$]

As yet another alternative approach, pilot aided frequency offset estimation can be employed. In this context "pilot aided" means that at least some pilot symbols are transmitted, which are known at the receiver side. For example, some values $A_m[k]$ represent estimates of the pilot symbols. In the mapping unit 162 of FIG. 8 these symbol estimates are replaced by the known pilot symbols. By this replacement decision errors are avoided, which could lead to a false frequency offset estimation. The drawback of a pilot aided frequency offset estimation lies in the redundancy of the pilot symbols, which reduce the overall data rate of the system.

Thus, advantageously embodiments of the present invention can be implemented by using a free-running reference frequency which does not have to be adjusted during reception and is characterized by low phase noise. Since the frequency offset has to be estimated anyway, the present invention advantageously reuses the frequency offset since it is identical to the sample clock offset. Further, with the present invention the complexity of the required timing drift compensation is kept to a minimum and is suitable for implementation purposes.

The solution adopted in the present invention provides timing drift compensation while receiving a PHY burst. This solution avoids changing the reference oscillator frequency, and can be implemented with digital signal processing, but still with very low complexity and high robustness.

Figure 9:
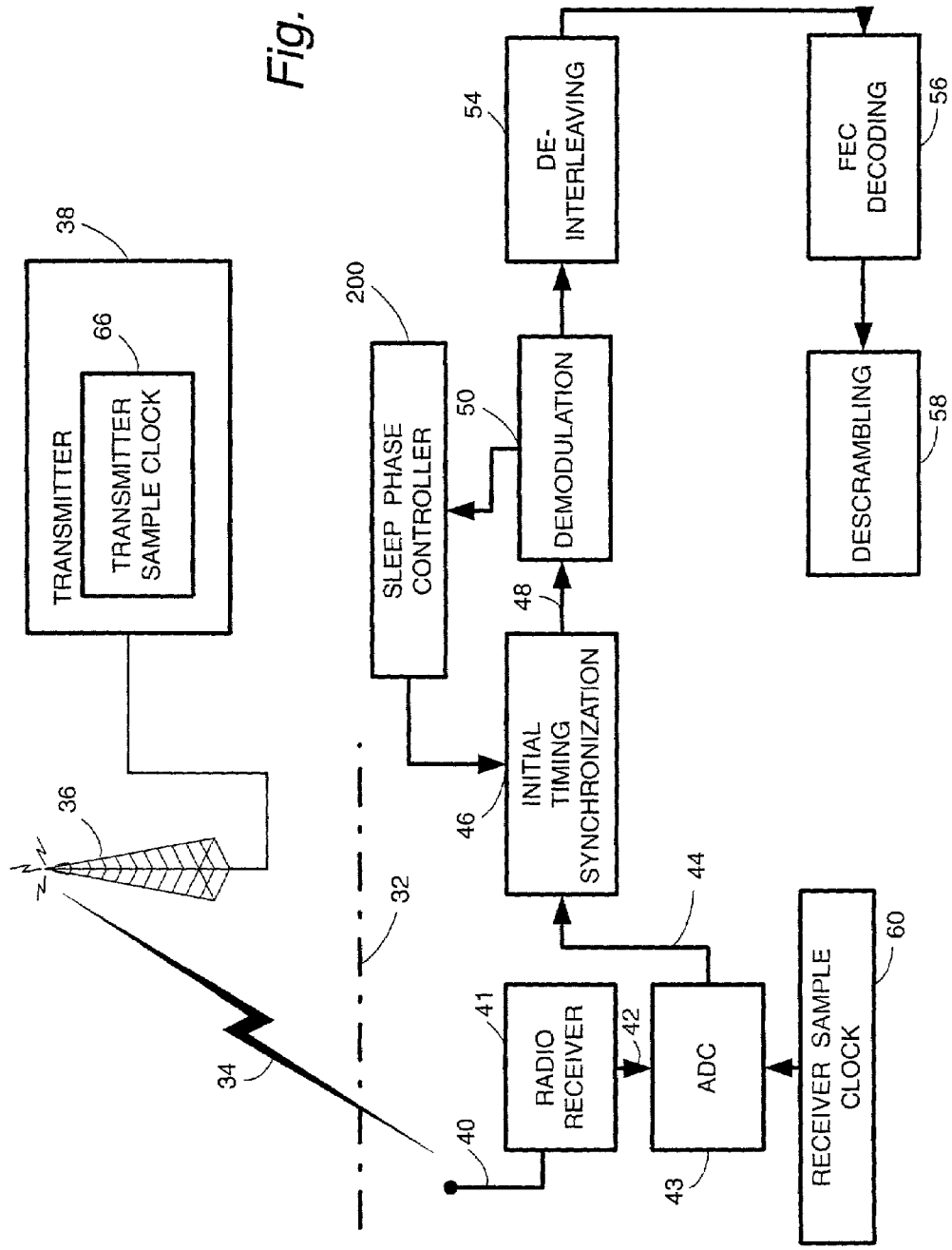
FIG. 9 is a schematic view of an example radio receiver which receives OFDM modulated signals from a transmitter, and which performs timing drift compensation after a sleep period according to an example mode the present invention.

FIG. 9 shows a radio receiver 30 which includes a sleep phase controller 200 which provides timing drift compensation after a sleep period. Selected elements of radio receiver 30 which facilitate timing drift compensation after a sleep period are shown in more detail in FIG. 10. The radio receiver 30 of the embodiment of FIG. 9 and FIG. 10 compensates for the timing drift in a situation in which the radio receiver 30 goes into sleep for a certain number of frames, then wakes up to receive one frame, and then either sleeps again or continues to receive frames. It should be understood that the sleep phase controller 200 of FIG. 9 and FIG. 10 can be used in conjunction with many forms and variation of the demodulation section, including the specific demodulation sections 50 previously described. For sake of simplification, only the preamble directed frequency offset estimation unit 102 and frequency correction unit 104 of the demodulation section 50 are shown in FIG. 10, it being understood that other elements are also included but not necessary for explanation of the sleep phase controller 200 per se.

There are various problems encountered in a sleep period scenario. A first such problem is that the timing drift during sleep has to be estimated to know when for the receiver to wake up. A second such problem is that the accuracy of the estimate has to be known in order to design a search window appropriately, i.e. the window during which a search for the start of the frame is done. These problems are relevant not only to OFDM systems, but to all systems with sleep mode.

Figure 11:
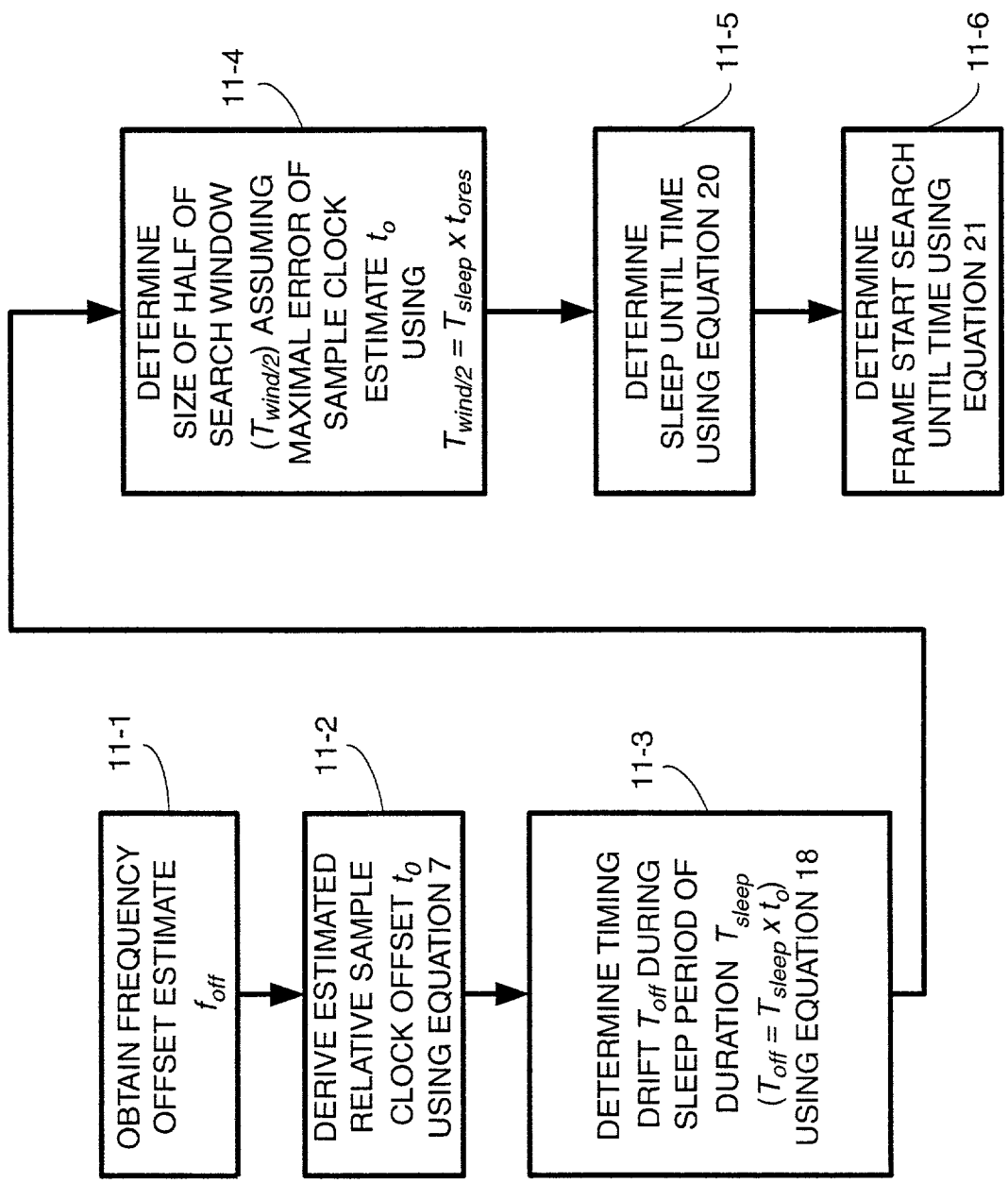
FIG. 11 is a flowchart showing certain basic, representative example steps performed by a sleep phase controller utilized in the radio receiver of FIG. 9 and FIG.

FIG. 11 shows certain basic, example steps performed by sleep phase controller 200 in accordance with a mode of the sleep mode aspect of the present invention. As explained below, the sleep phase controller 200 determines the timing drift $T_{off}$ in seconds during a sleep period, determines at time until which the receiver (e.g., mobile station) may sleep, and determines a frame start search until time (a time for which the searching for the start of a frame is to continue).

Figure 10:
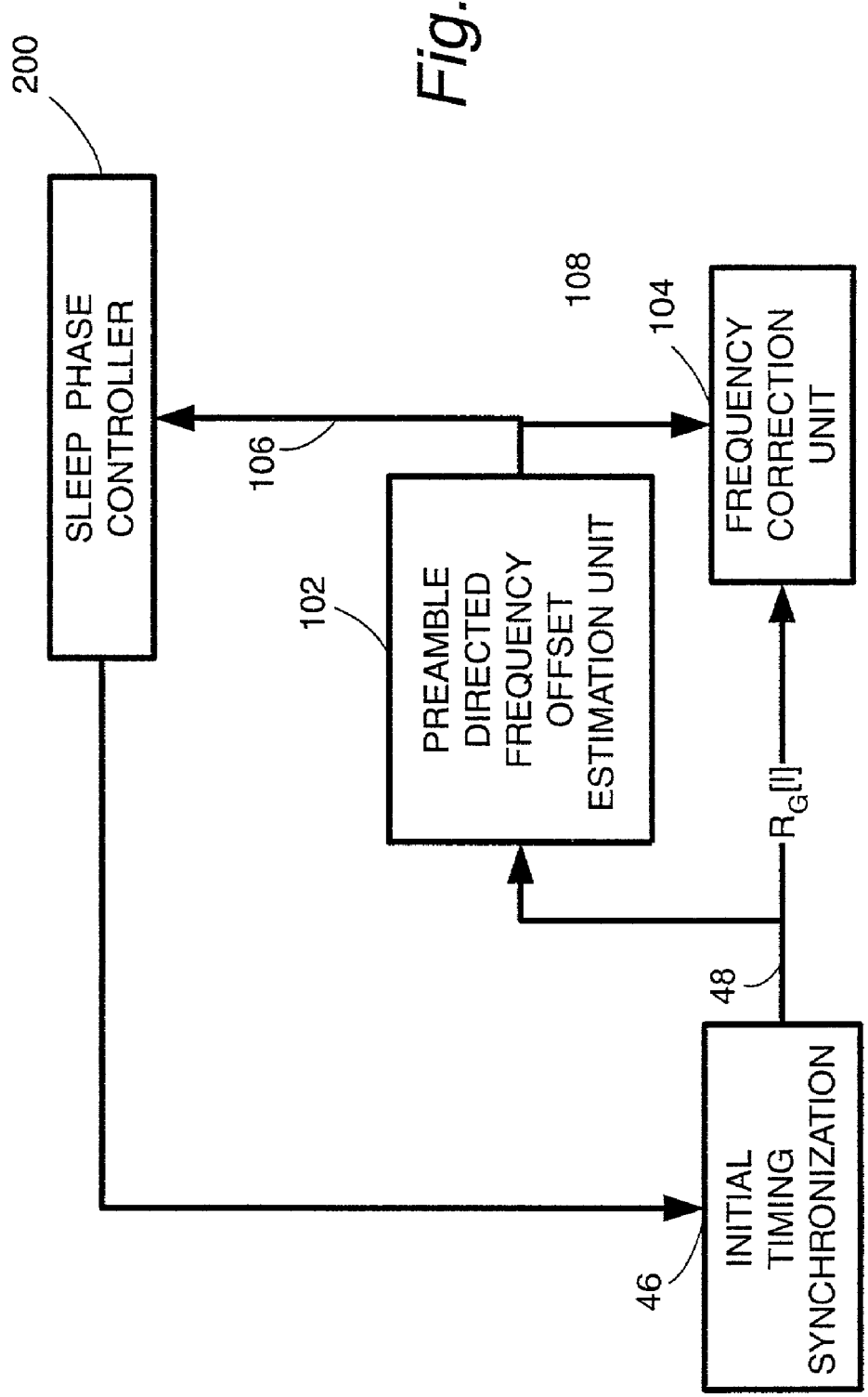
FIG. 10 is a schematic view of portions of the radio receiver of FIG. 9, showing particularly elements facilitating timing drift compensation after a sleep period.

Step 11-1 of the FIG. 11 procedure performed by sleep phase controller 200 shows sleep phase controller 200 receiving the frequency offset estimation $f_{off}$ from an appropriate frequency offset estimation unit (e.g., the preamble directed frequency offset estimation unit 102 of FIG. 10). After obtaining the frequency offset estimation $f_{off}$ at step 11-1, as step 11-2 the sleep phase controller 200 derives an estimated relative sample clock offset $t_0$ using Equation 7, previously provided.

As step 11-3 the sleep phase controller 200 uses the estimated relative sample clock offset $t_0$ to determine a timing drift during sleep. In particular, the timing drift $T_{off}$ in seconds during a sleep period of $T_{sleep}$ is calculated using Equation 18.

$$T_{off} = T_{sleep} \cdot t_0 \qquad \text{Equation 18}$$

In order to set an appropriate search window, the size of half of the search window must be determined. This involves determining the accuracy of the estimate $t_0$, e.g. by knowledge of the estimation algorithm. If it is assumed that $t_{0res}$ is the maximal error of the $t_0$ estimate expressed in relation to the sample clock frequency, then the sample clock offset estimate is $t_0 +/- t_{0res}$, e.g. 40 ppm+/−2 ppm. From this information as step 11-4 the sleep phase controller 200 can determine half the search window using Equation 19.

$$T_{wind/2} = T_{sleep} \cdot t_{0res} \qquad \text{Equation 19}$$

Then, counting from the time t=0 when entering sleep mode, as step 11-5 the sleep phase controller 200 determines that the mobile terminal should sleep until the time t expressed by Equation 20, and search for the start of the frame until the time of Equation 21.

$$t = T_{sleep} + T_{off} - T_{wind/2} \qquad \text{Equation 20}$$

$$t = T_{sleep} + T_{off} + T_{wind/2} \qquad \text{Equation 21}$$

Thus, the sleep phase controller 200 determines the timing drift in seconds during a sleep period, determines at time until which the receiver (e.g., mobile station) may sleep, and determines a frame start search until time (a time for which the searching for the start of a frame is to continue).

Although HIPERLAN/2 is used as an exemplary system herein, the present invention in its various aspects can be used in any OFDM system.

The constituent components of demodulation section 50 in the various aforedescribed embodiments have been termed as "units" for ease of reference. Alternatively, these units can be conceptualized in terms of functions. The units/functions of the demodulation section 50 may be implemented in diverse ways, including using individual hardware circuits, using software functioning in conjunction with a suitably programmed digital microprocessor or general purpose computer, using an application specific integrated circuit (ASIC), and/or using one or more digital signal processors (DSPs). Moreover, more than one of the units and functions as shown may be realized in any given hardware circuit or performed by execution of a processor or the like. Moreover, in this sense the timing correction unit can be realized by a controller or the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A radio receiver system comprising:
   a radio receiver which receives plural modulated radio frequency carriers and produces therefrom a modulated base-band signal, the plural modulated radio frequency carriers having been transmitted by a radio transmitter operating in accordance with a transmitter sample clock;
   a receiver sample clock which is used for sampling the modulated base-band signal;
   a timing correction unit which performs in the frequency domain a timing drift compensation between the transmitter sample clock and the receiver sample clock;
   a demodulation section which comprises the timing correction unit, and wherein the demodulation section further comprises:
   a frequency offset estimation unit which outputs a frequency offset estimation;
   frequency correction unit which receives the modulated base-band signal and outputs a frequency corrected modulated base-band signal;
   a fast Fourier transform (FFT) unit which receives the frequency corrected modulated base-band signal and outputs a frequency domain modulated subcarrier signal;
   a channel estimation unit which uses the frequency corrected modulated base-band signal to generate a frequency domain channel estimate which is applied to the timing correction unit;
   wherein the timing correction unit generates a time corrected channel estimate;
   a demodulator which uses the frequency domain modulated subcarrier signal and the time corrected channel estimate to generate a demodulated signal.

2. The apparatus of claim 1, wherein the plural modulated radio frequency carriers have been modulated using Orthogonal Frequency Division Multiplexing (OFDM).

3. The apparatus of claim 1, wherein the timing correction unit performs the timing drift compensation using a frequency estimation and frequency domain channel estimation.

4. The apparatus of claim 1, wherein the timing correction unit estimates a timing drift value and compensates for the timing drift value in the frequency domain by applying an appropriate phase factor to a subcarrier to update the channel estimate and thereby provide the time corrected channel estimate.

5. The apparatus of claim 4, wherein the timing correction unit updates the channel estimate using a relationship $$H_m[k] = \exp(j \cdot \phi_{m,k}) \cdot H_m[0]$$

wherein:
$H_m[k]$ is the time corrected channel estimate for a time index measured in data symbols k;
$H_m[0]$ is the frequency domain channel estimate for the data symbol k; $\phi_{m,k}$ is the phase factor; and wherein m is a subcarrier index for used subcarriers.

6. The apparatus of claim 5, wherein the phase factor $\phi_{m,k}$ is defined by the following expression:

$$\phi_{m,k} = \frac{(T_s \cdot (k-1) + T_{init}) \cdot t_0}{T} \cdot \frac{m}{32} \cdot \pi$$

wherein:
m is the subcarrier index;
k is the time index measured in data symbols;
$T_s$ is a symbol time;
T is a sample time;
$T_{init}$ is a time between a reference time and a first data symbol; and $t_0$ is the timing drift value.

7. The apparatus of claim 6, wherein the timing drift value $t_0$ is derived from the following relationship:

$$t_0 = \frac{f_{off}}{f_c}$$

wherein $f_{off}$ is an absolute frequency offset estimate in Hz, and $f_c$ is a carrier frequency in Hz.

8. The apparatus of claim 1, wherein the frequency offset estimation unit is a preamble directed frequency offset estimation unit which receives the modulated base-band signal.

9. The apparatus of claim 8, further comprising a decision directed frequency offset estimation unit which is connected to receive respective inputs from the demodulation unit, the timing correction unit, and the fast Fourier transform (FFT) unit.

10. The apparatus of claim 1, wherein the frequency offset estimation unit is a decision directed frequency offset estimation unit which is connected to receive respective inputs from the demodulation unit, the timing correction unit, and the fast Fourier transform (FFT) unit.

11. The apparatus of claim 1, wherein updating of the channel estimate for the timing drift compensation occurs every $M^{th}$ symbol.

12. The apparatus of claim 11, wherein a value for M is selected based on a particular link adaptation mode.

13. A radio receiver system comprising:
a radio receiver which receives plural modulated radio frequency carriers and produces therefrom a modulated base-band signal, the plural modulated radio frequency carriers having been transmitted by a radio transmitter operating in accordance with a transmitter sample clock;
a demodulation section which comprises the timing correction unit, and wherein the demodulation section further comprises:
a frequency offset estimation unit which outputs a frequency offset estimation;
a frequency correction unit which receives the modulated base-band signal and outputs a frequency corrected modulated base-band signal;
a fast Fourier transform (FFT) unit which receives the frequency corrected digital complex modulated base-band signal and outputs, for each subcarrier, a frequency domain modulated subcarrier signal which is applied to the demodulator;
a channel estimation unit which uses the frequency corrected modulated base-band signal and generates a frequency domain channel estimate;
wherein the timing correction unit receives the frequency offset estimation and the frequency domain modulated subcarrier signal to generate a time corrected frequency domain modulated subcarrier signal;
a demodulator which uses the time corrected frequency domain modulated signal and the frequency domain channel estimate to generate a demodulated signal.

14. The apparatus of claim 13, wherein the timing correction unit estimates a timing drift value and compensates for the timing drift value in the frequency domain by applying an appropriate phase factor to a subcarrier to update the frequency domain modulated subcarrier signal and thereby provide a time corrected frequency domain modulated signal.

15. The apparatus of claim 14, wherein the timing correction unit updates the frequency domain modulated signal using a relationship $$R_{TD,m}[k] = \exp(-j\phi_{m,k}) \cdot R_{FFT,m}[k]$$

wherein:
$R_{TD,m}[k]$ is the time corrected frequency domain modulated frequency domain signal of an $m^{th}$ subcarrier of a $k^{th}$ data carrying symbol;
$R_{FFT,m}[k]$ is the frequency domain modulated signal as output by the fast Fourier transform (FFT) unit of the $m^{th}$ subcarrier of the $k^{th}$ data carrying symbol; and $\phi_{m,k}$ is the phase factor; and wherein m is a subcarrier index for used subcarriers.

16. The apparatus of claim 15, wherein the phase factor $\phi_{m,k}$ is defined by the following expression:

$$\phi_{m,k} = \frac{(T_s \cdot (k-1) + T_{init}) \cdot t_0}{T} \cdot \frac{m}{32} \cdot \pi$$

wherein:
m is the subcarrier index;
k is the time index measured in data symbols;
$T_s$ is a symbol time;
T is a sample time;
$T_{init}$ is a time between a reference time and a first data symbol; and $t_0$ is the timing drift value.

17. The apparatus of claim 16, wherein the timing drift value $t_0$ is derived from the following relationship:

$$t_0 = \frac{f_{off}}{f_c}$$

wherein $f_{off}$ is an absolute frequency offset estimate in Hz, and $f_c$ is a carrier frequency in Hz.

18. The apparatus of claim 13, wherein the frequency offset estimation unit is a preamble directed frequency offset estimation unit which receives the modulated base-band signal.

19. The apparatus of claim 18, further comprising a decision directed frequency offset estimation unit which is connected to receive respective inputs from the demodulation unit, the timing correction unit, and the channel estimation unit.

20. The apparatus of claim 13, wherein the frequency offset estimation unit is a decision directed frequency offset estimation unit which is connected to receive respective inputs from the demodulation unit, the timing correction unit, and the channel estimation unit.

21. A radio receiver system comprising:
a radio receiver which receives plural modulated radio frequency carriers and produces therefrom a modulated base-band signal, the plural modulated radio frequency carriers having been transmitted by a radio transmitter operating in accordance with a transmitter sample clock;
a receiver sample clock which is used for sampling the modulated base-band signal;
a timing correction unit which performs in the frequency domain a timing drift compensation between the transmitter sample clock and the receiver sample clock;
wherein the timing correction unit uses a frequency offset to determine a timing drift value, wherein the subcarrier signal comprises a stream of data symbols, further comprising:
a frequency offset estimation unit which calculates:
an estimated phase offset for each data symbol as a function of the data symbol;
a predicted phase offset for each data symbol as a function of the estimated phase offset thereof and an estimated phase offset of a preceding one of the data symbols in the stream;
a predicted sample phase offset for each data symbol as a function of a predicted phase offset of a corresponding one of the data symbol; and
the frequency offset as a function of the predicted sample phase offset for each data signal sample.

22. The apparatus of claim 21, wherein the frequency offset calculation unit comprises:
a phase locked loop for generating the predicted phase offset;
a phase discrimination unit for generating an estimated phase offset for each data signal as a function thereof;
a filter for receiving estimated phase offsets and generating the predicted phase offset for each data symbol as a function of the estimated phase offset thereof and the estimated phase offset of a preceding one of the data symbols.

23. A method of operating radio receiver system comprising:
receiving plural modulated radio frequency carriers and producing therefrom a modulated base-band signal, the plural modulated radio frequency carriers having been transmitted by a radio transmitter operating in accordance with a transmitter sample clock;
sampling the modulated base-band signal in accordance with a receiver sample clock;
performing in a frequency domain a timing drift compensation between the transmitter sample clock and the receiver sample clock;
generating a frequency offset estimation;
generating a frequency corrected modulated base-band signal;
using a fast Fourier transform (FFT) unit to generate a frequency domain modulated subcarrier signal using the frequency corrected modulated base-band signal;
using the frequency corrected modulated base-band signal to generate a frequency domain channel estimate;
generating a time corrected channel estimate using the frequency domain channel estimate;
using the frequency domain modulated subcarrier signal and the time corrected channel estimate to generate a demodulated signal.

24. The method of claim 23, wherein the plural modulated radio frequency carriers have been modulated using Orthogonal Frequency Division Multiplexing (OFDM).

25. The method of claim 23, further comprising performing the timing drift compensation using a frequency estimation and frequency domain channel estimation.

26. The method of claim 23, further comprising estimating a timing drift value and compensating for the timing drift value in the frequency domain by applying an appropriate phase factor to a subcarrier to update the channel estimate and thereby provide a time corrected channel estimate.

27. The method of claim 26, wherein the channel estimate is updated using a relationship $$H_m[k] = \exp(j \cdot \phi_{m,k}) \cdot H_m[0]$$

wherein:
$H_m[k]$ is the time corrected channel estimate for a time index measured in data symbols k;
$H_m[0]$ is the frequency domain channel estimate for the data symbol $\phi_{m,k}$ is the phase factor; and wherein m is a subcarrier index for used subcarriers.

28. The method of claim 27, wherein the phase factor $\phi_{m,k}$ is defined by the following expression:

$$\phi_{m,k} = \frac{(T_s \cdot (k-1) + T_{init}) \cdot t_0}{T} \cdot \frac{m}{32} \cdot \pi$$

wherein:
m is the subcarrier index;
k is the time index measured in data symbols;
$T_s$ is a symbol time;
T is a sample time;
$T_{init}$ is a time between a reference time and a first data symbol; and $t_0$ is the timing drift value.

29. The method of claim 28, wherein the timing drift value $t_0$ is derived from the following relationship:

$$t_0 = \frac{f_{off}}{f_c}$$

wherein $f_{off}$ is an absolute frequency offset estimate in Hz, and $f_c$ is a carrier frequency in Hz.

30. The method of claim 23, wherein the frequency offset estimation is obtained from a preamble directed frequency offset estimation unit which receives the modulated base-band signal.

31. The method of claim 23, wherein the frequency offset estimation is obtained from a decision directed frequency offset estimation unit.

32. The method of claim 23, wherein updating of the channel estimate for the timing drift compensation occurs every $M^{th}$ symbol.

33. The method of claim 32, wherein a value for M is selected based on a particular link adaptation mode.

34. A method of operating radio receiver system comprising:
   receiving plural modulated radio frequency carriers and producing therefrom a modulated base-band signal, the plural modulated radio frequency carriers having been transmitted by a radio transmitter operating in accordance with a transmitter sample clock;
   sampling the modulated base-band signal in accordance with a receiver sample clock;
   generating a frequency offset estimation;
   generating a frequency corrected modulated base-band signal;
   using the frequency corrected digital modulated base-band signal and generating, for each subcarrier, a frequency domain modulated subcarrier signal;
   using the frequency corrected modulated base-band signal to generate a frequency domain channel estimate;
   performing in a frequency domain a timing drift comprising between the transmitter sample clock and the receiver sample clock by using the frequency offset estimation and the frequency domain modulated subcarrier signal to generate a time corrected frequency domain modulated subcarrier signal;
   using the time corrected frequency domain modulated signal and the frequency domain channel estimate to generate a demodulated signal.

35. The method of claim 34, wherein the timing correction unit estimates a timing drift value and compensates for the timing drift value in the frequency domain by applying an appropriate phase factor to a subcarrier to update the frequency domain modulated subcarrier signal and thereby provide a time corrected frequency domain modulated signal.

36. The method of claim 35, further comprising updating the frequency domain modulated signal using a relationship $$R_{TD,m}[k] = \exp(-j\phi_{m,k}) \cdot R_{FFT,m}[k]$$

wherein:
   $R_{TD,m}[k]$ is the time corrected frequency domain modulated frequency domain signal of an $m^{th}$ subcarrier of a $k^{th}$ data carrying symbol;
   $R_{FFT,m}[k]$ is the frequency domain modulated signal as output by the fast Fourier transform (FFT) unit of the $m^{th}$ subcarrier of the $k^{th}$ data carrying symbol; and $\phi_{m,k}$ is the phase factor; and wherein m is a subcarrier index for used subcarriers.

37. The method of claim 36, wherein the phase factor $\phi_{m,k}$ is defined by the following expression:

$$\phi_{m,k} = \frac{(T_s \cdot (k-1) + T_{init}) \cdot t_0}{T} \cdot \frac{m}{32} \cdot \pi$$

wherein:
m is the subcarrier index;
k is the time index measured in data symbols;
$T_s$ is a symbol time;
T is a sample time;
$T_{init}$ is a time between a reference time and a first data symbol; and $t_0$ is the timing drift value.

38. The method of claim 37, wherein the timing drift value $t_0$ is derived from the following relationship:

$$t_0 = \frac{f_{off}}{f_c}$$

wherein $f_{off}$ is an absolute frequency offset estimate in Hz, and $f_c$ is a carrier frequency in Hz.

39. The method of claim 34, wherein the frequency offset estimation is obtained from a preamble directed frequency offset estimation unit which receives the modulated base-band signal.

40. The method of claim 34, wherein the frequency offset estimation is obtained from a decision directed frequency offset estimation unit.

41. A method of operating radio receiver system comprising:
   receiving plural modulated radio frequency carriers and producing therefrom a modulated base-band signal, the plural modulated radio frequency carriers having been transmitted by a radio transmitter operating in accordance with a transmitter sample clock;
   sampling the modulated base-band signal in accordance with a receiver sample clock;
   performing in a frequency domain a timing drift compensation between the transmitter sample clock and the receiver sample clock;
   using a frequency offset to determine a timing drift value, wherein the subcarrier signal comprises a stream of data symbols, further comprising calculating:
     an estimated phase offset for each data symbol as a function of the data symbol;
     a predicted phase offset for each data symbol as a function of the estimated phase offset thereof and an estimated phase offset of a preceding one of the data symbols in the stream;
     a predicted sample phase offset for each data symbol as a function of a predicted phase offset of a corresponding one of the data symbol; and the frequency offset as a function of the predicted sample phase offset for each data signal sample.

42. The method of claim 41, further comprising:
generating the predicted phase offset;
generating an estimated phase offset for each data signal as a function thereof;
receiving estimated phase offsets and generating the predicted phase offset for each data symbol as a function of the estimated phase offset thereof and the estimated phase offset of a preceding one of the data symbols.

* * * * *